United States Patent

[11] 3,581,182

| [72] | Inventors | David W. Comstock<br>Milford;<br>Edwin R. Campbell, Monroe, both of, Conn. |
|------|-----------|---|
| [21] | Appl. No. | 614,679 |
| [22] | Filed | Feb. 8, 1967 |
| [45] | Patented | May 25, 1971 |
| [73] | Assignee | United Aircraft Corporation<br>East Hartford, Conn. |

[54] DIGITAL INDICATOR STEP MOTOR SYSTEM
7 Claims, 12 Drawing Figs.

[52] U.S. Cl. .................................................. 318/685,
340/324, 310/156, 318/602
[51] Int. Cl. ......................................................... G05b 19/40
[50] Field of Search .......................................... 340/324;
318/138, 254, 20, 315, 310; 310/49, 156

[56] References Cited
UNITED STATES PATENTS

| 3,178,599 | 4/1965 | Krupick et al. | 310/156X |
| 3,239,738 | 3/1966 | Welch | 310/49 |
| 3,331,005 | 7/1967 | Lear et al. | 310/49X |
| 3,243,677 | 3/1966 | Cannalte et al. | 318/138 |
| 3,297,927 | 1/1967 | Blakeslee et al. | 318/138 |
| 3,304,480 | 2/1967 | Ko | 318/254 |
| 3,309,592 | 3/1967 | Faure | 318/138 |
| 3,328,658 | 6/1967 | Thompson | 318/138 |
| 3,374,410 | 3/1968 | Cronquist et al. | 318/138 |

*Primary Examiner*—G. R. Simmons
*Attorney*—Shenier & O'Connor

ABSTRACT: A digital indicator system in which a command signal activates a switching network selectively to couple digitally generated, bipolar, phase-displaced signals to the two-phase internal stator windings of a stepper motor having an outer permanent magnet rotor to cause the rotor always to step in the same direction no matter at what time the switching network is activated by the command signal. The rotor locks magnetically onto the stator poles of one phase when the input to the motor disappears. Miniature code drums driven by the stepper motor rotors provide feedback signals which are compared with the command signal to deactivate the switching network when the rotors reach the commanded positions.

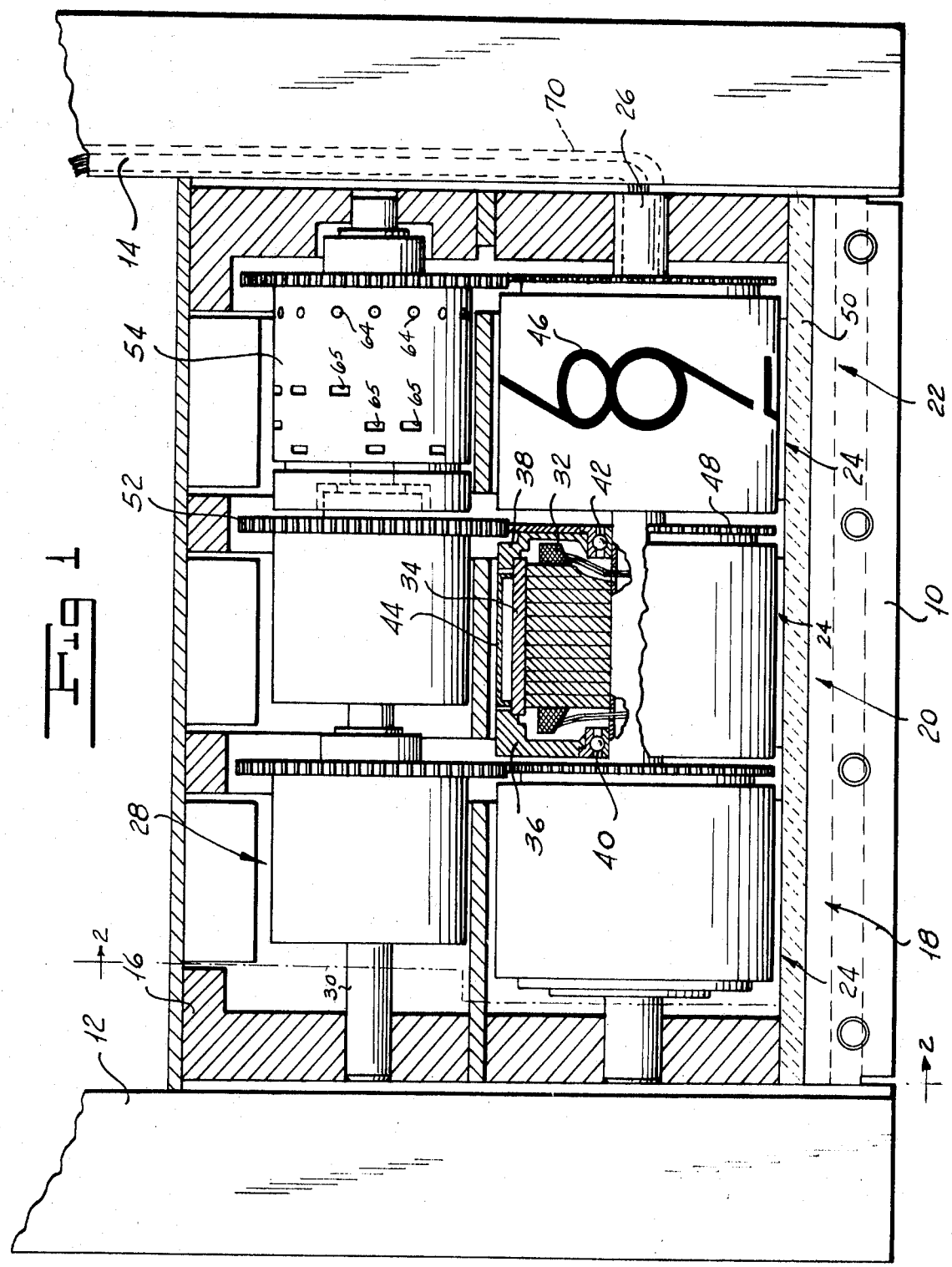

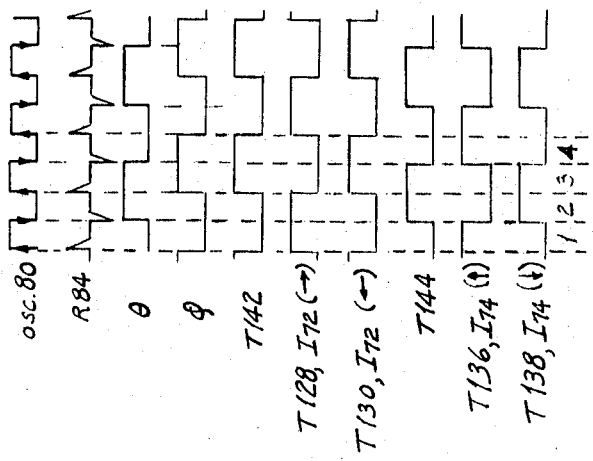
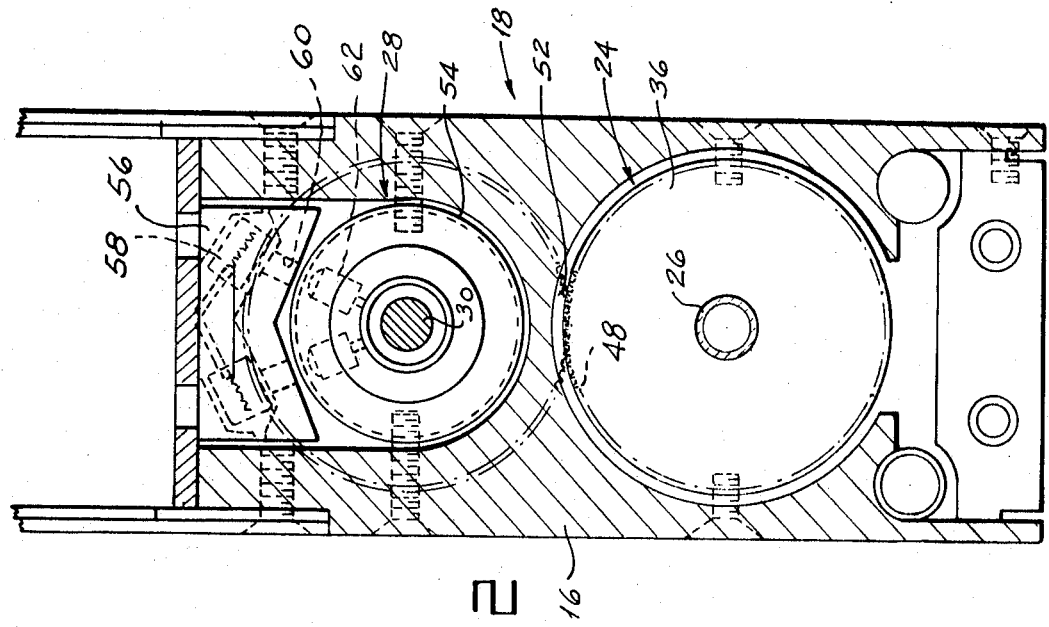

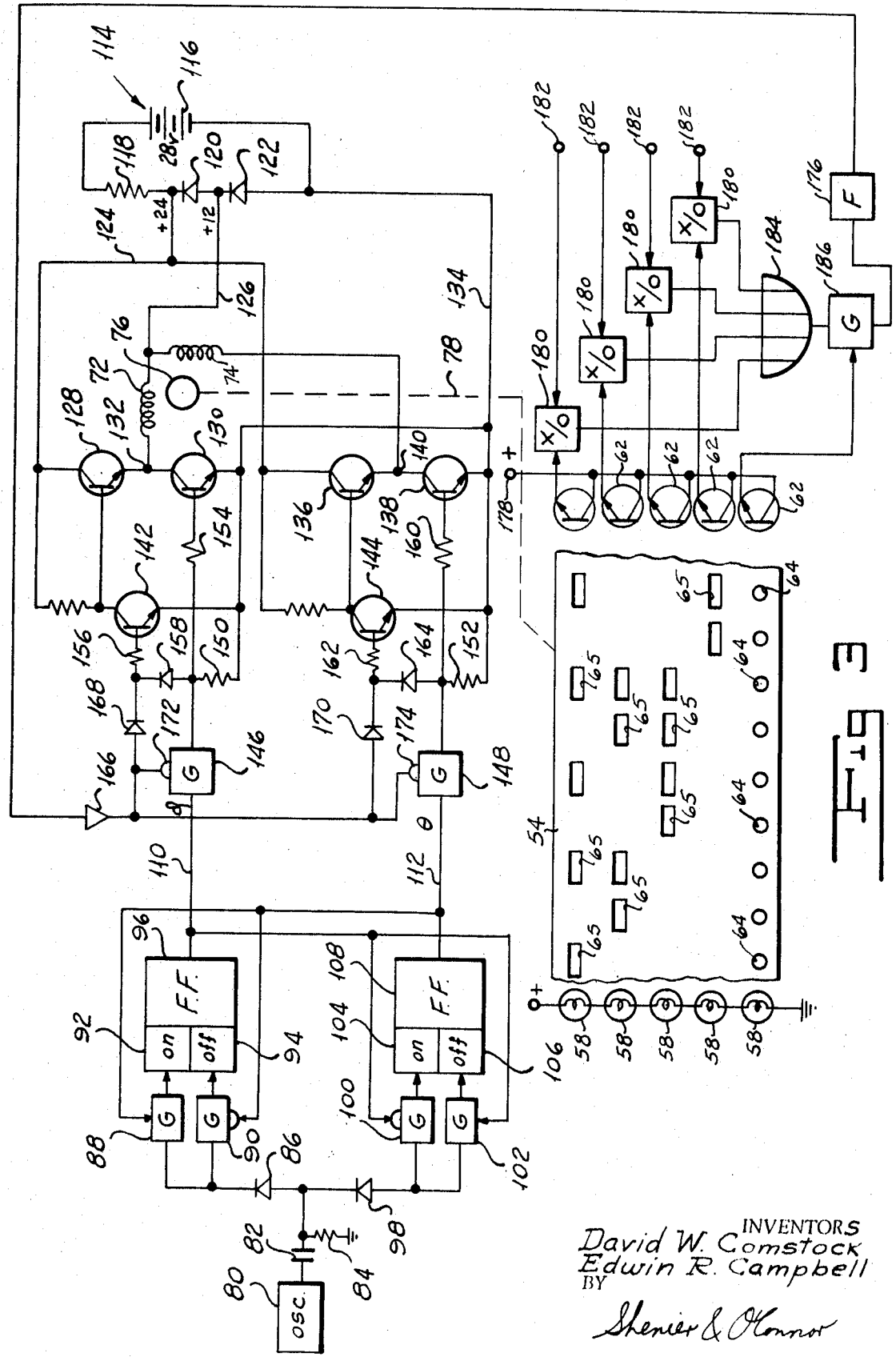

INVENTORS
David W. Comstock
Edwin R. Campbell
BY
Shenier & O'Connor
ATTORNEYS

DIGITAL INDICATOR STEP MOTOR SYSTEM

BACKGROUND OF THE INVENTION

Our invention relates to an indicator system for displaying a number of digits or characters to an observer. Various arrangements have been proposed in the prior art for displaying a line of digits or characters. Some of the systems employ tapes carrying discrete characters and drive the tapes selectively to display the desired arrangement. Other systems use drums selectively positioned to provide the display. It has further been proposed that arrangements be provided in which the element, such as a drum, carrying the characters be provided with a pattern of "fused" characters in which the characters are scrambled and in which common portions of different characters are superposed. In such arrangements, the observer's view of the pattern in any one of the positions to which the pattern-carrying element can be driven is restricted to the extent of a single character.

While many of the systems of the prior art successfully achieve the result of displaying a plurality of digits or characters in a line, they embody a number of defects. Many of them are too large to permit their use in certain installations. Generally units of the prior art are expensive. They are moreover not as reliable as is desirable. Operation of the units produces radiofreqency interference with the function of other system components of the installation.

We have invented a digital indicator system which is an improvement over systems of the prior art. The construction of our system facilitates assembly and repair of the unit. It is less expensive than are systems of the prior art of comparable size and reliability. It is more reliable than are systems of the prior art. It generates no radiofrequency interference with other system components. It is smaller, lighter and simpler in construction than are units of the prior art. The direction of rotation of the driven element can be reversed in a simple and expeditious manner.

SUMMARY OF THE INVENTION

One object of our invention is to provide an improved digital indicator system which is less expensive and more reliable than are systems of the prior art.

Another object of our invention is to provide a digital indicator system which generates no radiofrequency interference.

A further object of our invention is to provide a digital indicator system which is simple, small and light.

A still further object of our invention is to provide a simplified driving system for our digital indicator system.

Other and further objects of our invention will appear from the following description.

In general our invention contemplates the provision of an improved digital indicator system in which a command signal activates a switching network selectively to couple digitally generated, bipolar, phase-displaced signals to the windings of a two-phase internal stator provided with an outer permanent magnet rotor to cause the rotor always to step in the same direction no matter at what time the switching network is activated. When the motor input disappears, the rotor poles lock magnetically onto the stator poles of one phase in the commanded position. Miniature code drums driven by the unit motor rotors provide feedback signals which are compared with the command signal to deactivate the switching network when the commanded position has been reached.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a top plan view of one form of our digital display system with parts removed and with other parts broken away.

FIG. 2 is a sectional view of the form of our digital display system shown in FIG. 1 taken along the line 2-2 of FIG. 1.

FIG. 3 is a schematic view of one unit of our digital display system and its associated driving circuitry.

FIG. 4 is a diagram illustrating the mode of operation of the arrangement shown in FIG. 3.

DESCRIPTION OF THE PREFERRED EMBODIMENTS

Figure 6:
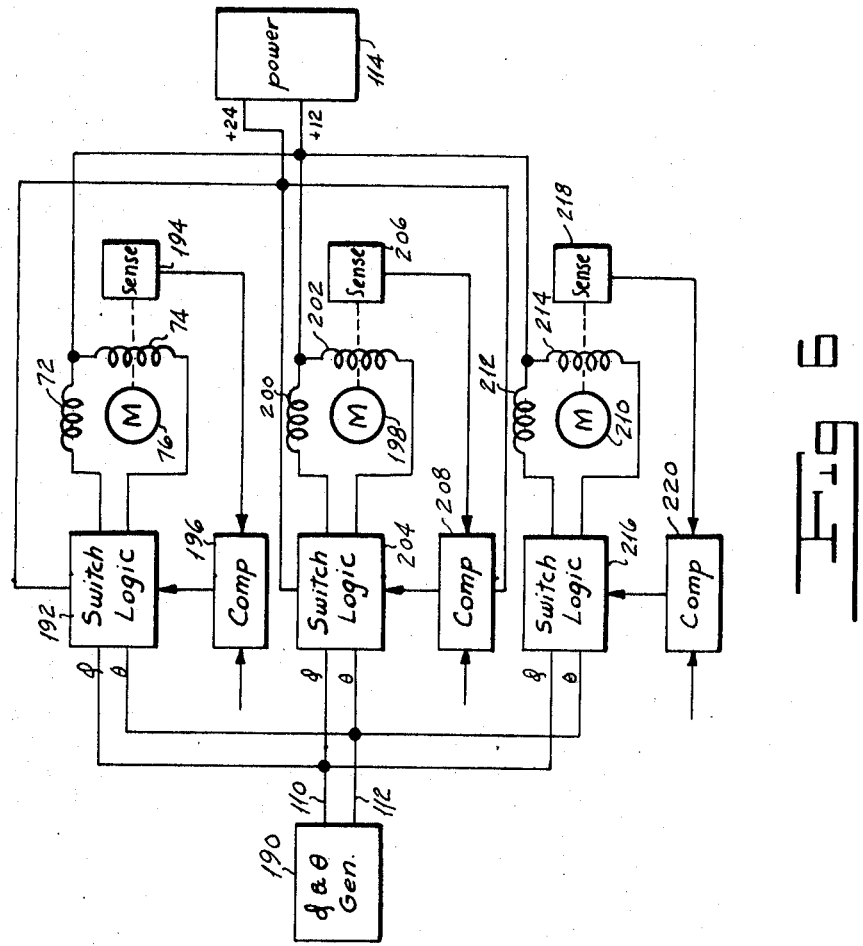
FIG. 6 is a schematic view illustrating the driving system of our digital display system.

Referring now to FIGS. 1 and 2 of the drawings, the form of our digital display system illustrated therein includes a U-shaped frame 10 having legs 12 and 14. Frame 10 supports an indicator motor and feedback drum housing 16 in any suitable manner. The housing 16, in turn, carries a plurality of respective units 18, 20 and 22, each of which corresponds to one character of the desired display. By way of example only, we have illustrated three units in FIG. 1. It will readily be appreciated from the description hereinafter that we may provide additional units as is necessary or desirable.

Each of the units 18, 20 and 22 includes a respective stepper motor, indicated generally by the reference character 24, supported on a common hollow shaft 26 carried by the housing 16. Each of the units 18, 20 and 22 further includes a feedback code drum assembly, indicated generally by the reference character 28, carried by a common shaft 30 supported in the housing 16.

Figure 5:
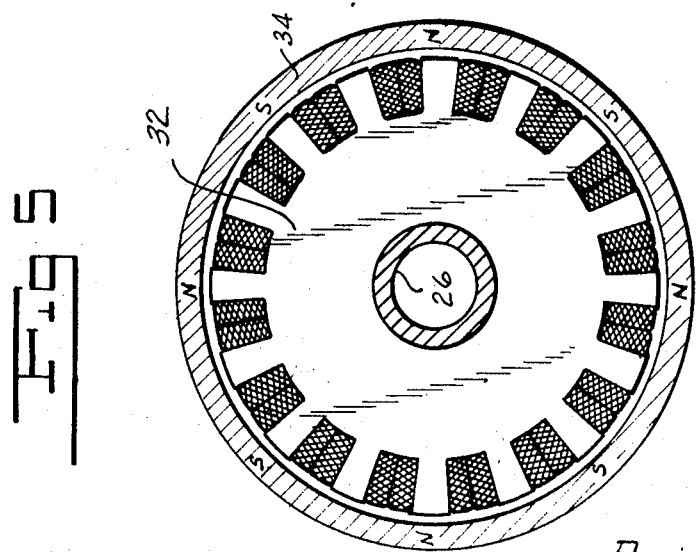
FIG. 5 is a sectional view illustrating the construction of one of the motors of our digital display system.

Referring now to FIGS. 1, 2 and 5, each of the motor units 24 includes a laminated stator core 32 secured to the shaft 26 by any suitable means known in the art. Each motor also includes a generally cylindrical permanent magnet rotor 34 carried by end plates 36 and 38 supported on respective bearings 40 and 42 carried by the shaft 26. We mount an element 44 carrying circumferentially disposed fused indicia 46 on the surface thereof. We mount a gear 48 on one of the end plates, such as the plate 38, for rotation therewith. Frame 12 supports a window 50 having an opening of restricted height so that only one character formed by the indicia 46 is visible at any one time.

Each gear 48 drives an associated gear 52 of one of the code drum units 28. Each of the drum units includes a drum 54 rotatably supported on shaft 30. In response to movement of one of the rotors 34, gear 48 drives its associated gear 52 to rotate the drum 54 to which the gear is secured. Any suitable means, such as a block 56, supports a plurality of respective bulbs 58. We form the block 56 with openings 60 through which light from the bulbs 58 can pass toward the periphery of the code drum 54. We mount sensing elements 62 within the drum 54 in alignment with the openings 60. Drum 54 is provided with a plurality of equally circumferentially spaced holes 64 and with a series of rows of openings 65 arranged in a coded pattern. Each row of openings 65 is aligned with a hole 64. In any particular position of the drum, predetermined openings 65 will be aligned with the openings 60 so that only certain ones of the sensors 62 will be illuminated by the lamps 58. As will be explained more fully hereinafter, with this arrangement a coded output indicative of the position of the drum 54 and thus of the character being displayed by the associated element 44 is produced.

Referring now to FIG. 5, we have illustrated the construction of one of the motors 24 carried by the hollow shaft 26. We provide the stator 32 with a plurality of salient poles 66 equally spaced around the periphery of the stator. In the particular embodiment shown, there are 16 poles around the periphery of stator 32. Each pole 66 carries a coil 68 forming a part of one phase of the stator of the motor 24. Specifically, we so connect coils 68 that one set carried by alternate poles 66 forms one phase of the stator winding while the remaining coils 68 form the other phase. Rotor 34 is a permanent magnet having a number of equally spaced poles around its periphery.

In the particular embodiment shown the rotor 34 has eight equally spaced poles.

With the construction illustrated in FIG. 5 and as will be more fully explained hereinafter, we so energize the stator phases as to cause the rotor to step in one direction in 22½° steps. While we have illustrated a particular construction comprising 16 stator poles and eight rotor poles to provide 22½° steps and 16 discrete positions, we could as well make motors incorporating the same principle having four, eight, 12, 24 or more positions. In any one of the positions to which the rotor may be moved under the influence of signals applied to the stator windings, it will lock or detent with the permanent magnet poles of the rotor locked onto the stator poles when the stator is deenergized. It will be noted moreover that our motor requires no brushes and that the rotor 34 revolves freely on its bearings 40 and 42. We are also able to bring out all the winding leads through the hollow shaft 26. As shown in FIG. 1, we provide the leg 14 with a slot 70 for bringing all the leads back to the drive circuitry to be described.

Referring now to FIG. 3, we have shown one form of driving circuit which may be employed to step the rotor 34 to the desired position. The two phases of the stator are indicated schematically as 72 and 74. We have indicated the rotor schematically as 76 and gearing 48, 52 is indicated by the broken line 78 leading from rotor 76 to the drum 54.

Our drive circuit includes a multivibrator 80 adapted to produce a generally square or rectilinear waveform at a frequency of about 40 cycles per second for example. From the 40-cycle output of the oscillator 80 we generate two bipolar 20-cycle signals having 90° relative phase displacement. A differentiating circuit comprising a capacitor 82 and a resistor 84 produces sharp pulses in response to the positive and negative excursions of the 40-cycle waveform. A first diode 86 applies the positive-going pulses to respective gates 88 and 90 adapted to apply the pulses to the On terminal 92 and to the Off terminal 94 of a flip-flop 96 which changes state in response to the pulses. A second diode 98 applies the negative-going pulses to gates 100 and 102 adapted respectively to apply the pulses to the On terminal 104 and to the Off terminal 106 of a second flip-flop 108.

In order to ensure that there will be no phase reversal in the operation of this system, we apply the output of flip-flop 96, appearing on conductor 110 to an inhibiting input terminal of gate 100 and to a control input terminal of gate 102. Similarly, the output of the flip-flop 108, appearing on a conductor 112 is applied to an inhibiting input terminal of a gate 90 and to a control input terminal of gate 88. In response to a positive-going excursion of the output of oscillator 80, the resultant positive pulse passes through normally conductive gate 90 to the Off section 92 of flip-flop 96 to cause the conductor 110 to drop substantially to ground potential. At the next and negative excursion of the output of oscillator 80, a negative pulse passes through normally conductive gate 100 to turn the flip-flop 108 on. The pulse corresponding to the next and positive-going excursion of the output of oscillator 80 is to turn the flip-flop 96 on. The now existing output on conductor 112 has inhibited gate 90 and has rendered gate 88 conductive to ensure that this next pulse is applied to On section 92 to turn the flip-flop 96 on so that its output rises to a suitable positive potential. The operation of flip-flops 96 and 108 can readily be followed through in this manner. It will readily be appreciated that the result of the operation is a first signal $\theta$ on the conductor 112 having a frequency of 20 cycles and a signal $\Phi$ on the conductor 110 having a frequency of 20 cycles and lagging the signal $\theta$ by 90°. Moreover, our arrangement ensures that there will be no phase reversal which, as will be apparent from the description hereinbelow, might produce an incorrect direction of rotation of the motor unit rotors.

The power supply, indicated generally by the reference character 114, of our driving system includes a battery 116 having a potential of, for example, 28 volts. We connect the battery in a series circuit with a current limiting resistor 118 and a pair of Zener diodes 120 and 122. The arrangement is such that diode 120 provides a potential of about 24 volts for supply conductor 124 while diode 122 provides a potential of about 12 volts for supply conductor 126, which we connect to the common terminal of windings 72 and 74.

Respective switching transistors 128 and 130 are adapted to be rendered selectively conductive in a manner to be described when a control operation is initiated alternatively to connect a terminal 132 of winding 72 to the 24-volt line 124 and to a power supply return line 134.

A second pair of switching transistors 136 and 138 are adapted to be rendered selectively conductive in a manner to be described alternatively to connect a terminal 140 of winding 74 to the 24-volt line 124 and to the power supply return line 134. We provide our circuit with a pair of control transistors 142 and 144 so arranged respectively that when transistor 142 is conductive, transistor 128 is disabled and when transistor 144 is conductive, transistor 136 is disabled.

Respective normally conductive gating circuits 146 and 148 are adapted to apply the signals $\Phi$ and $\theta$ across resistors 150 and 152. We connect resistor 150 to the base resistor 154 of transistor 130 and to the base resistor 156 of transistor 142 through a diode 158. Similarly, we connect the resistor 152 to the base resistor 160 of transistor 138 and to the base resistor 162 of transistor 144 through a diode 164.

As will be explained more fully hereinafter, our system includes a source of a command signal for actuating the circuit of FIG. 3 when the associated rotor is to be positioned at a particular location. The arrangement is such that when the rotor is correctly positioned, a signal is applied by an amplifier 166 to base resistors 156 and 162 by diodes 168 and 170 and to respective inhibiting input terminals 172 and 174 of gates 146 and 148.

In the embodiment of our driving circuit illustrated in FIG. 3, a flip-flop circuit 176 normally provides a positive output signal in the absence of an input signal thereto to inhibit the gates 146 and 148 and to ensure that the transistors 142 and 144 are conductive. The arrangement of the code drum 54, a developed view of which is shown in FIG. 3, cooperating with the lamps 58 and sensors 62, is adapted to provide a signal input to flip-flop 176 whenever the commanded position of rotor 34 differs from the actual rotor position. In the form of our system shown, the sensors 62 may be phototransistors which are rendered conductive when light above a certain level falls on the sensitive element thereof. We provide one sensing element 62 for each line of coded openings 65 and we provide one element 62 for the line of holes 64. Each of the sensing elements 62 associated with a line of coded openings 65 is connected between a terminal 178 carrying a positive potential and one input terminal of a respective exclusive OR circuit 180. The other input terminal of each of the circuits 180 receives an input from one of the command signal input terminals 182 of the system.

It will be seen that with one of the openings 65 disposed in the space between a lamp 58 and a sensor 62, the sensor will be conductive to apply the potential at terminal 178 to one input of the associated circuit 180. If no corresponding input exists at the associated terminal 182, then the circuit 180 produces an output signal. On the other hand, if there exists an input signal at the associated terminal 182, then the circuit 180 produces no output signal. A four-input OR circuit 184 couples the output of the exclusive OR circuits 180 to a gating circuit 186. This gating circuit 186 is normally nonconductive and may be rendered conductive by the application of a signal to its control input terminal 188 to couple an input signal to flip-flop 176.

In order to avoid ambiguities in the output of our system, we enable gate 186 only at times at which the rotor 34 is accurately located in one of its 16 positions. To achieve this we connect the sensor 62 associated with the small openings 64 between terminal 178 and the control terminal 188. Thus, when one of the small openings 64 is between a lamp 58 and the sensor 62 associated with holes 64, a strobe pulse is applied to terminal 188 to render gating circuit 186 conductive to apply any input thereto to flip-flop 176 to cause the flip-flop output to be grounded to permit gates 146 and 148 to conduct and to cut off transistors 142 and 144 when no signals are applied thereto by diodes 158 and 164.

The manner in which our motor steps around to its various positions and magnetically detents thereat can best be understood by reference to FIGS. 3, 4 and 7. In FIG. 7 we have indicated the rotor 76 as a circle and its permanent magnet poles by the legends "S" and "N." To provide a reference pole we have placed an arrow at one of the South poles of the rotor. The stator and its changing polarity poles are indicated on a circle within circle 76. By way of illustration we have designated the poles associated with one phase by the subscript "0" and we have designated the poles of the other phase by the subscript "1."

As shown in FIG. 4, oscillator 80 produces a generally rectangular output waveform. The differentiating circuit made up of capacitor 82 and resistor 84 provides a series of alternately positive-going and negative-going sharp pulses. The diode 86 applies the positive-going pulses to the gates 88 and 90 while the diode 98 applies the negative-going pulses to gates 100 and 102. Assuming that the output of flip-flop 96 is at a positive level and that the output of flip-flop 108 is at ground level, gate 90 will be conductive and the next positive-going pulse will actuate the section 94 of flip-flop 96 to change the flip-flop output condition to substantially ground level. Under this condition gate 100 will be conductive and the next negative-going pulse from the differentiating circuit passes to section 104 of flip-flop 108 to turn that flip-flop to a condition at which its output is at a positive level. This output renders gate 88 conductive so that the next positive-going pulse turns flip-flop 96 to a condition at which its output is at a positive level. This operation can be followed through to see that the result will be a generally rectangular wave form $\Phi$ from flip-flop 96 having a frequency which is half the frequency of the oscillator output. The output $\theta$ of flip-flop 108 will be of the same frequency and will lead the signal $\Phi$ by 90°.

Assuming that the actual position of the rotor 76 differs from the commanded position so that the output of amplifier 166 is substantially ground, then each of the gates 146 and 148 will be conductive and the transistors 142 and 144 will not be rendered conductive. Under these conditions, the signal $\theta$ is applied to the bases of the two transistors 142 and 130 while the signal $\theta$ is applied to the bases of the two transistors 138 and 144. Thus, as a result, transistors 128 and 130 are each conductive for a half cycle of the signal $\Phi$ and transistors 136 and 138 are each conductive for a half cycle of the signal $\theta$. With transistor 128 conductive and with transistor 130 nonconductive, current will flow from left to right through the winding 72 as viewed in FIG. 3. Conversely, with transistor 130 conductive and with transistor 128 nonconductive, current will flow from right to left through winding 72. With transistor 136 conductive and with transistor 138 nonconductive, current will flow upwardly through winding 74 as viewed in FIG. 3. Conversely, with transistor 138 conductive and with transistor 136 cut off, current will flow downwardly through winding 74.

With the phase relationship of the signals $\Phi$ and $\theta$ indicated above, four sequential combinations of current-flow through windings 72 and 74 exist in the course of one complete cycle. These conditions are: flow to the right through winding 72 with flow upwardly through winding 74, flow to the right through winding 72 with flow downwardly through winding 74, flow to the left through winding 72 with flow downwardly through winding 74 and flow to the left through winding 72 with flow upwardly through winding 74. These combinations cause the rotor 76 always to step in the same direction.

Figure 7A:
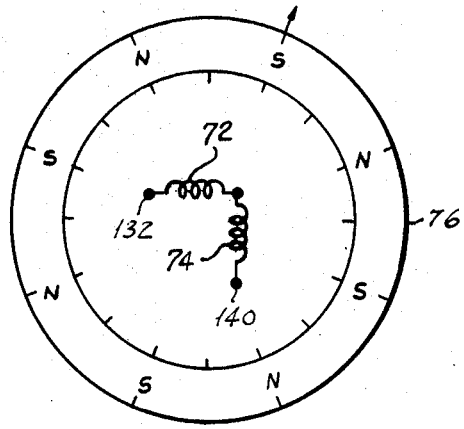
FIGS. 7A to 7F are diagrammatic views illustrating the mode of operation of one unit of our digital display system.
Figure 7B:
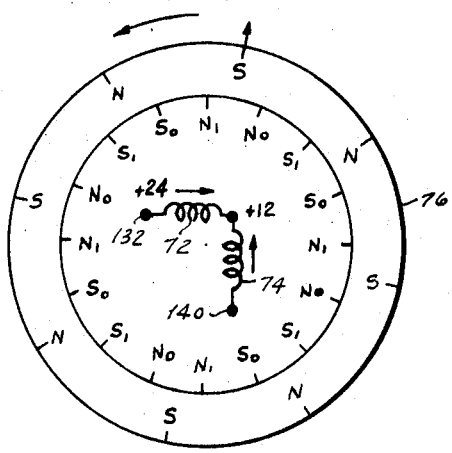
Figure 7C:
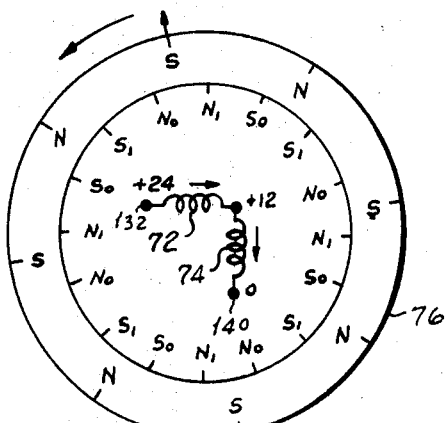
Figure 7D:
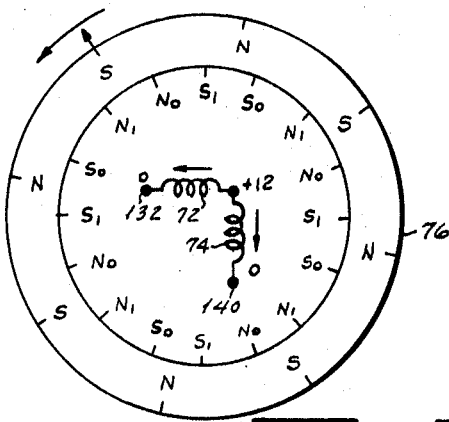
Figure 7E:
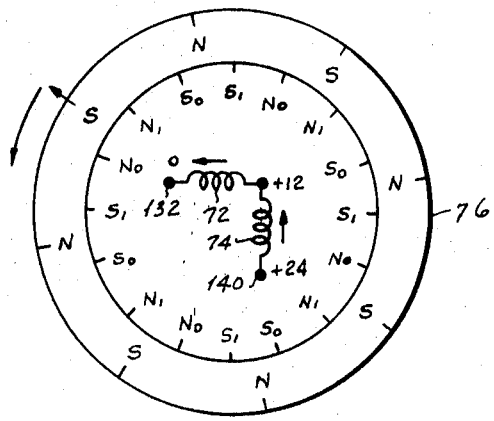
Figure 7F:
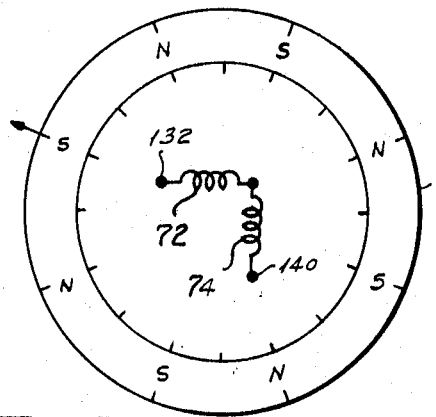

In FIG. 7A we have illustrated rotor 76 as being locked magnetically in one of its various positions with its poles aligned with one set of stator poles. If, now, the first set of conditions described above comes into being, both the stator pole on which the reference rotor pole was locked and the other phase pole to the left will be North poles, with the result that the rotor tends to rotate in a counterclockwise direction as viewed in FIG. 7B. Upon the occurrence of the second, third and fourth conditions outlined above and illustrated, respectively, in FIGS. 7C, 7D and 7E, the rotor continues to move in a counterclockwise direction. If now energization to the windings is interrupted, the rotor continues to move until its poles lock magnetically onto the set of poles being approached next by the rotor in its direction of movement as indicated in FIG. 7F. Thus, the rotor has moved through five of its 16 steps.

Our arrangement is such that the rotor will always rotate in the same direction no matter at what time a command signal appears to initiate movement of the rotor. That is, while there may initially be a tendency of the rotor to begin to move in the other direction, the sequence of signals is such that its overall movement will be in the same direction. This direction in which the rotor steps can be reversed by a simple wiring change of reversing the stator phases.

Referring now to FIG. 6, we have illustrated the manner in which a number of individual motors can be made to timeshare much of the circuitry. In the FIG. we have indicated the circuitry for generating the signals $\Phi$ and $\theta$ by block 190 having output conductors 110 and 112. The switching logic for coupling these signals to the windings 72 and 74 of the motor having a rotor 76 is indicated by block 192. Block 194 indicates the sensing system which feeds back a signal representing actual rotor position to the comparator system 196, which provides an input to the switching logic in such a way as to activate it when the actual and command positions differ.

We provide a second character display motor having a rotor 198 and stator phases 200 and 202 to which the signals $\Phi$ and $\theta$ may be coupled from conductors 110 and 112 by switching logic 204. A sensing system 206 similar to the system 194 provides a feedback to the comparator 208 which is adapted to activate the switching logic 204.

A third character display motor has a rotor 210 and stator phases 212 and 214 to which signals $\Phi$ and $\theta$ may be coupled by the logic network 216 which is similar to network 192. A sensing system 218 similar to the system 194 provides a feedback to the comparator 220 which actuates the logic system 216. In this arrangement the power supply 114 supplies power to all the units. Thus, both the power supply and the generating system 190 are shared by all the motor assemblies. While we have illustrated an arrangement providing only three characters, it will readily be appreciated that we may provide more characters as desired.

The operation of all of the motor units and their associated circuitry is substantially the same. Considering the motor system comprising rotor 76, the generating system 190 provides respective signals $\Phi$ and $\theta$ on conductors 110 and 112, which signals are 90° displaced in phase. In response to these signals and in the presence of a signal indicating that the actual rotor position differs from the commanded position, the switching logic 192 provides four distinct sequential current-flow conditions in windings 72 and 74 which cause rotor 76 always to step in the same direction. As soon as the rotor arrives in the commanded position, the output of the comparator system 196 turns the switching logic 192 off. The rotor 76 then locks magnetically on the set of stator poles being approached in the direction of movement thereof.

It will be seen that we have accomplished the objects of our invention. We have provided an improved digital indicator system which is less expensive and more reliable than are systems of the prior art. Our system is simple, small and light. It generates no radiofrequency interference with other components. Our system ensures that the movable, character-carrying element always moves in the same direction no matter at what time the switching circuit is activated. The direction of rotation may readily be reversed. It consumes appreciably less power than a system of the prior art for displaying the same number of characters.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A digital indicator system including in combination a stator having a plurality of salient poles, a two-phase stator winding comprising a first phase winding carried by alternate ones of said stator poles and a second phase winding carried by the other stator poles, said windings having a common terminal, a permanent magnet rotor having a plurality of poles, one plurality of poles comprising twice the number of poles in the other plurality, means mounting said rotor and stator for relative rotary movement to a number of positions equal to the number of poles in the first plurality, and means for sequentially and successively producing current flow through said first and second phase windings in one direction, through said first phase winding in said one direction and through the second phase winding in another direction, through said first and second phase windings in said other direction and through said first phase winding in said other direction and through said second phase winding in said one direction to step said rotor through said positions, said current flow producing means comprising means for applying a first potential of a certain value to said common terminal, means providing a second potential of a value less than that of the first potential and a third potential of a value greater than that of said first potential, and means for switching the other terminals of said phase windings between said second and third potentials.

2. A system as in claim 1 in which said current flow producing means comprises means providing first and second phase-displaced switching signals, respective first and second switching means associated with said windings, means for applying the first switching signal to the first switching means for coupling the other terminal of the first winding alternately to the second potential and to the third potential and means for applying the second switching signal to the second switching means for coupling the other terminal of the second winding alternately to said second potential and said third potential.

3. A system as in claim 1 in which said switching means comprises first switching means for alternately producing current flow in one direction through said first winding and producing current flow in the other direction through said first winding, second switching means for alternately producing current flow in one direction through said second winding and for producing current flow in the other direction through said second winding, means providing respective phase-displaced first and second switching signals and means for applying said signals respectively to said windings.

4. A system as in claim 1 in which said current flow producing means comprising a common power source providing said potentials.

5. A system as in claim 1 in which said rotor is disposed radially outwardly of said stator.

6. A digital indicator system including in combination a stator having a plurality of salient poles, a two-phase stator winding comprising a first phase winding carried by alternate ones of said stator poles and a second phase winding carried by the other stator poles, said windings having a common terminal, a permanent magnet rotor having a plurality of poles, one plurality of poles comprising twice the number of poles in the other plurality, means mounting said rotor and stator for relative rotary movement to a number of positions equal to the number of poles in the first plurality, and means for sequentially and successively producing current flow through said first and second phase windings in one direction, through said first phase winding in said one direction and through the second phase winding in another direction, through said first and second phase windings in said other direction and through said first phase winding in said other direction and through said second phase winding in said one direction to step said rotor through said positions, said current flow producing means being normally disabled, said system including means producing a signal representing the actual position of said rotor, a source of a command signal representing a desired position of said rotor and means responsive to said actual position signal and to said command signal for enabling said current flow producing means when said actual position differs from said desired position.

7. A digital indicator system including in combination a stator having a plurality of salient poles, a two-phase stator winding comprising a first phase winding carried by alternate ones of said stator poles and a second phase winding carried by the other stator poles, said windings having a common terminal, a permanent magnet rotor having a plurality of poles, one plurality of poles comprising twice the number of poles in the other plurality, means mounting said rotor and stator for relative rotary movement to a number of positions equal to the number of poles in the first plurality, and means for sequentially and successively producing current flow through said first and second phase windings in one direction, through said first phase winding in said one direction and through the second phase winding in another direction, through said first and second phase windings in said other direction and through said first phase winding in said other direction and through said second phase winding in said one direction to step said rotor through said positions, said current flow producing means comprising an oscillator having a certain frequency and means responsive to said oscillator for producing switching signals having a frequency substantially different from that of said oscillator.